United States Patent [19]
Wright et al.

[11] Patent Number: 5,173,195
[45] Date of Patent: * Dec. 22, 1992

[54] PHASE SEPARATOR MODULE

[75] Inventors: Francis C. Wright, Yardville; David A. Goding, Dover, both of N.J.

[73] Assignee: Mercer International, Inc., Mendham, N.J.

[*] Notice: The portion of the term of this patent subsequent to Jul. 2, 2008 has been disclaimed.

[21] Appl. No.: 693,338

[22] Filed: Apr. 29, 1991

Related U.S. Application Data

[63] Continuation of Ser. No. 484,682, Feb. 23, 1990, Pat. No. 5,028,333.

[51] Int. Cl.$^5$ .............................................. B01D 21/00
[52] U.S. Cl. ................................ 210/802; 210/237; 210/521; 210/522
[58] Field of Search ............... 210/232, 237, 521, 522, 210/801-803; 55/440

[56] References Cited

U.S. PATENT DOCUMENTS

| | | |
|---|---|---|
| 1,709,676 | 4/1929 | Martyn . |
| 3,563,389 | 2/1971 | Mizrahi et al. . |
| 3,615,025 | 10/1971 | Rice et al. .............................. 210/521 |
| 3,666,111 | 5/1972 | Pielkenrood et al. . |
| 3,666,112 | 5/1972 | Pielkenrood et al. . |
| 3,741,401 | 6/1973 | Hsiung .............................. 210/521 X |
| 3,837,501 | 9/1974 | Pielkenrood . |
| 3,847,813 | 11/1974 | Castelli ................................. 210/232 |
| 4,014,669 | 3/1977 | Thompson et al. ............... 55/440 X |
| 4,054,529 | 10/1977 | Pielkenrood . |
| 4,194,976 | 3/1980 | Robinsky . |
| 4,273,654 | 6/1981 | Pielkenrood . |
| 4,346,005 | 8/1982 | Zimmerman ......................... 210/232 |
| 4,544,487 | 10/1985 | Bosniak .............................. 210/522 |
| 4,643,834 | 2/1987 | Batutis . |
| 4,681,683 | 7/1987 | Lindstol . |
| 4,717,475 | 1/1988 | Brandy et al. ....................... 210/237 |
| 4,747,196 | 5/1988 | Moir ................................. 210/521 X |
| 4,919,812 | 4/1990 | Lasson .............................. 210/522 X |

Primary Examiner—Charles Hart
Attorney, Agent, or Firm—Alan M. Sack

[57] ABSTRACT

A phase separator apparatus is disclosed which utilizes phase separator modules for insertion in a separation tank. The modules include a frame for retaining a plurality of impingement plates within the frame utilizing removable retention means, such as slots, allowing easy removal and replacement of the impingement plates. The phase separator module also includes vertical baffles for blocking the flow of fluid to be separated and forming a quiescent region on either side of the impingement plates normal to the direction of flow to the fluid to be separated. The removable retention means, such as slots in the frame, not only allow removal for cleaning and maintenance of the plates, but also provide a means for adjusting the spacing of the gap between the plates, the plate length or a combination of both, in order to modify the efficiency of the separator. The phase separator modules of the present invention are especially suited for cocurrent cross-flow separation of a multiphase aqueous mixture, such as that of oil, water and suspended solids.

36 Claims, 6 Drawing Sheets

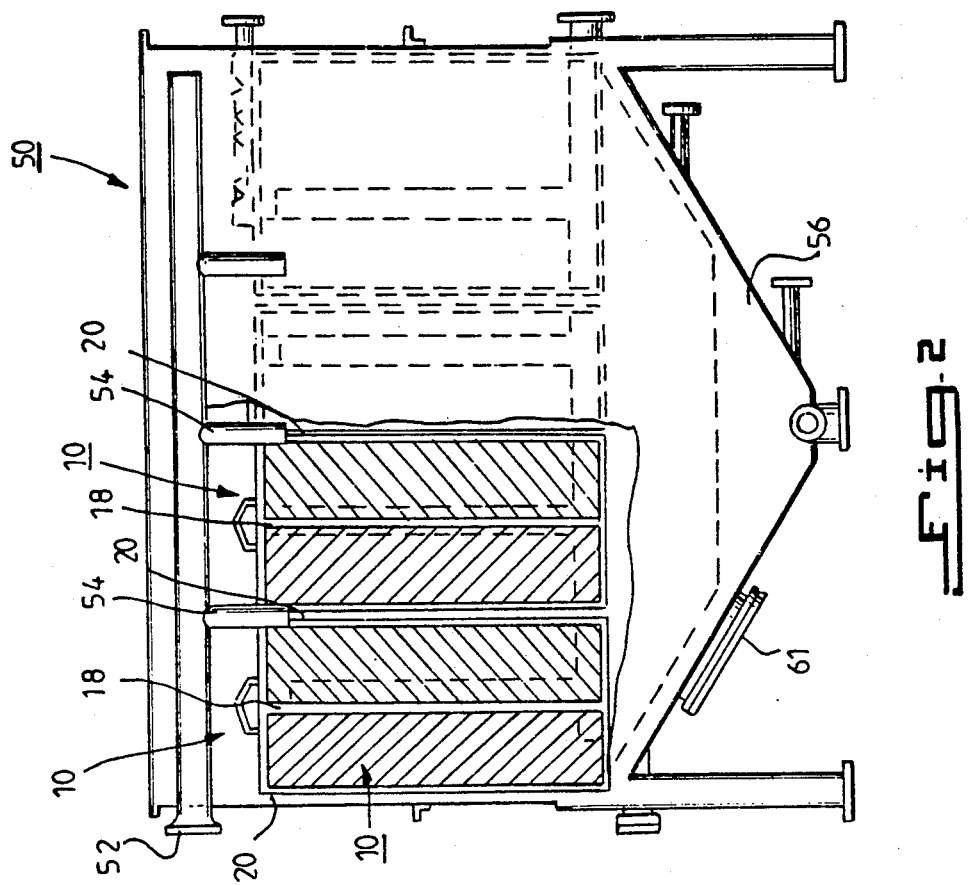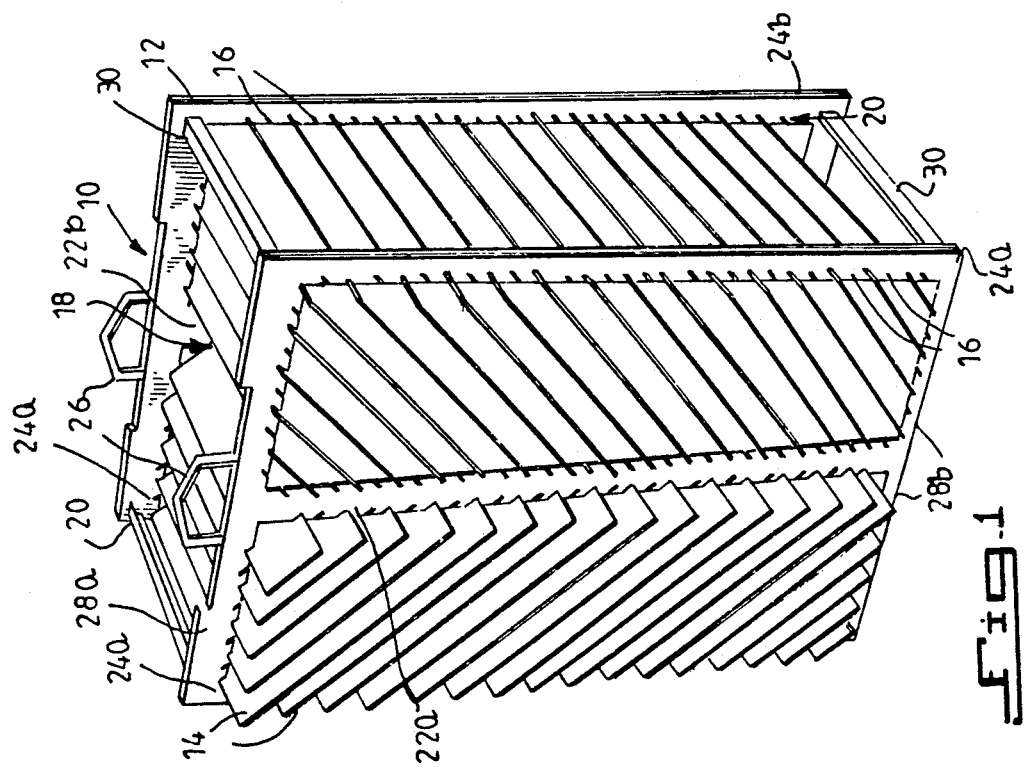

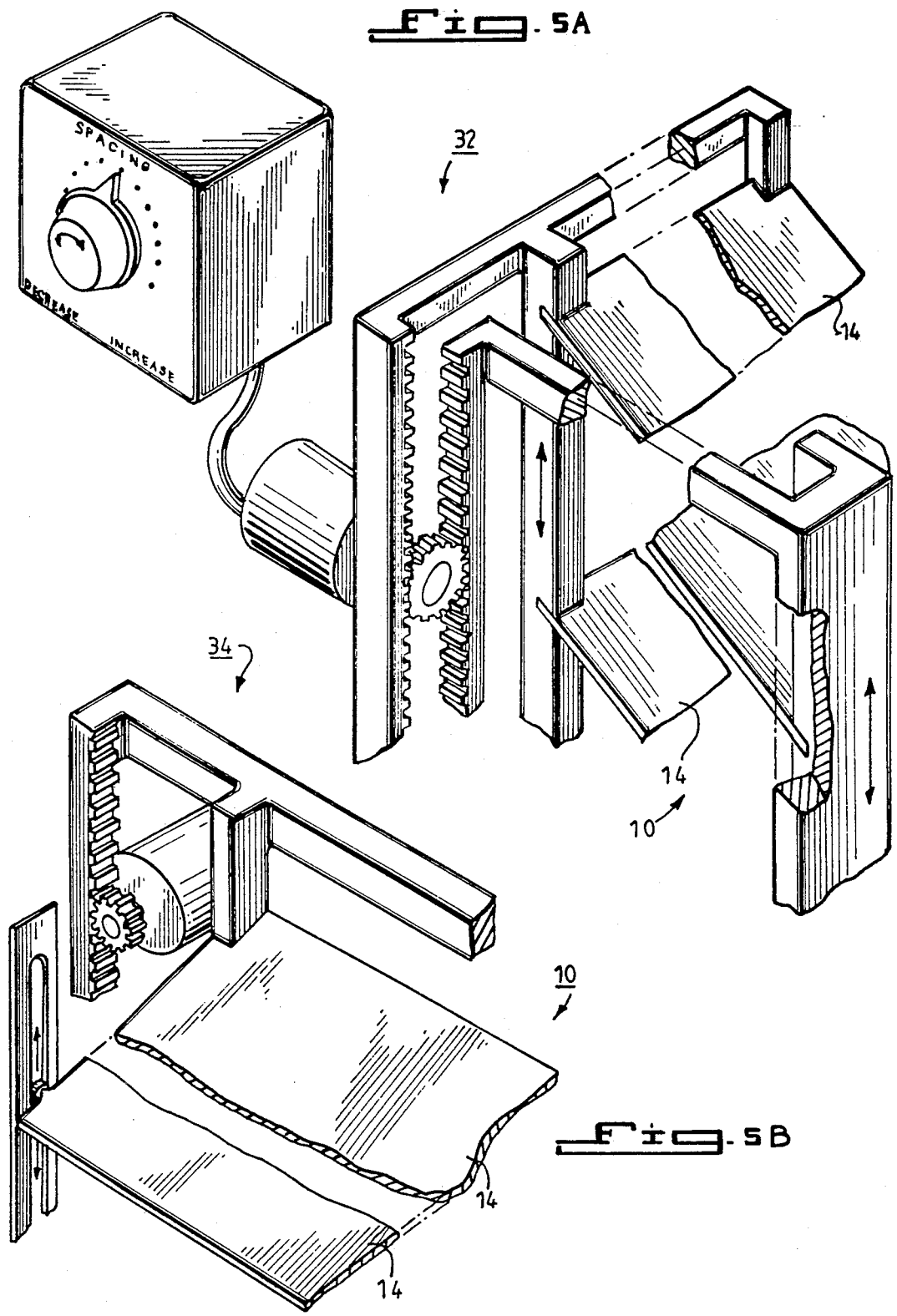

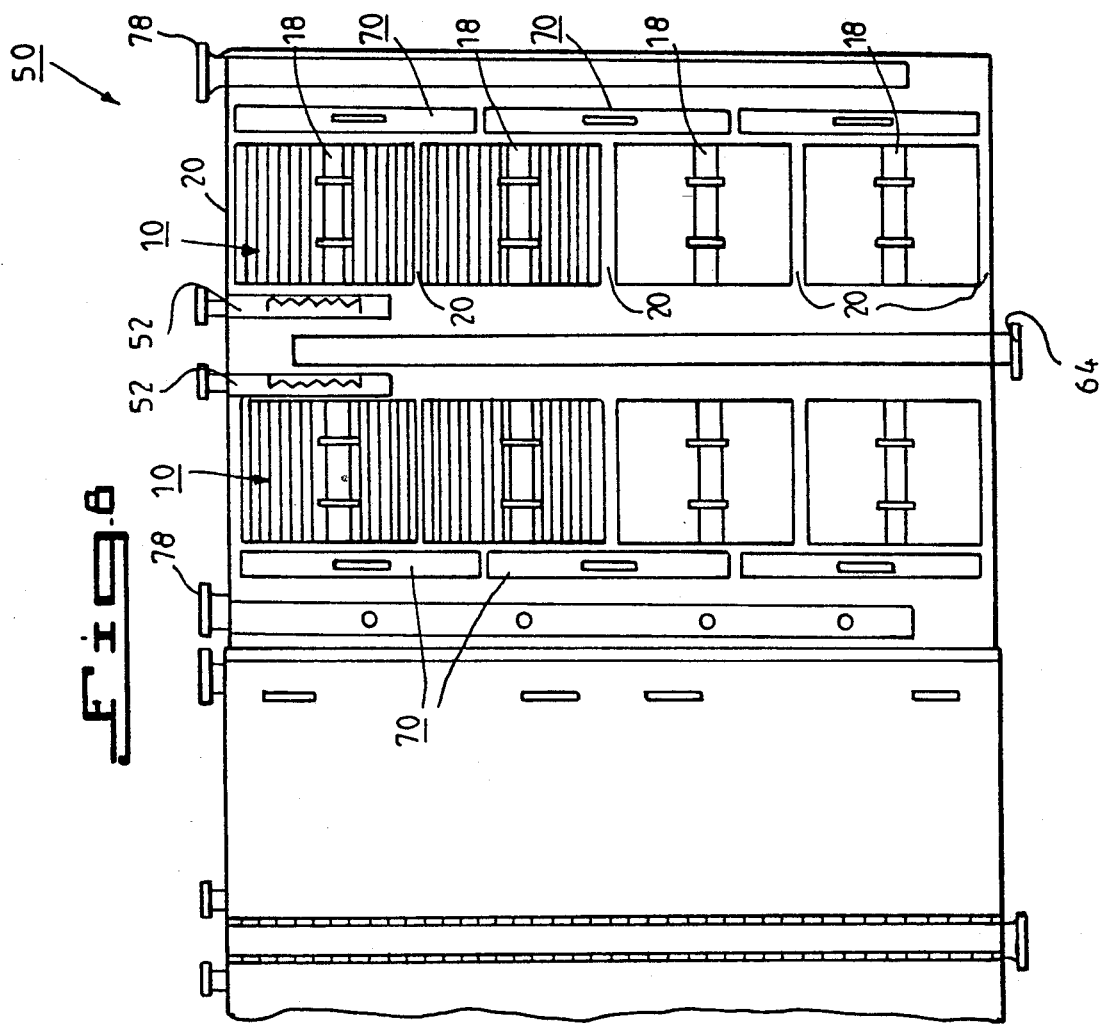

PHASE SEPARATOR MODULE

This is a continuation of copending application Ser. No. 07/484,682, filed on Feb. 23, 1990 and now U.S. Pat. No. 5,028,33.

BACKGROUND OF THE INVENTION

1. Field Of The Invention

This invention relates to phase separator modules and, more specifically, to cross-flow co-current phase separator modules for separating mixtures of particles, oil and water.

2. Background Of The Related Art

Industrial waste water often includes a multi-phase mixture of water, oil and suspended particles. A variety of techniques have been devised for separating the components of such suspensions, including filtration, centrifugation, extraction and sedimentation. The details of many of these techniques are well-known to those skilled in the art.

Gravitational separators utilize the force of gravity to induce sedimentation and agglomeration of the heavier components from the mixture, while the lighter components suspended in the mixture tend to coalesce, agglomerate and rise to the surface. The lighter phase is then removed from the surface by skimmers and other well-known techniques.

In order to enhance gravitational separation and coalescence, high surface area sieves and plates are placed in the flow of the fluid being separated. Generally the plates are welded or permanently attached to the sides of the separator tank. Waste water, however, can vary greatly in character. Often the contaminated waste water has large amounts of heavy oils and suspended solids which may adhere and block the sieves and plates of most oil/water separators. In such cases, the efficiency of the separator may not be a major consideration, but the ease of cleaning and replacement of the plates and filters is paramount. In other situations, the contaminated waste water may have a relatively high oil concentration with a low percentage of solids. In these situations, the efficiency of the separator may be a much more important factor than the ease of cleaning and blocking of the sieves and plates.

Generally, two impingement plate orientations may be found in phase separators. The first, called the countercurrent design, includes a plurality of parallel plates which are sloped at an angle, either upwardly or downwardly, in the direction of waste water flow. The plates, therefore, force the waste water to flow in the direction of the plates' slope either upwardly or downwardly. For example, when the plates are sloped upwardly, solids impinge on the top surface of the settling plates and slide down the plate due to the force of gravity against the flow of the waste water. When a second set of plates is used in series with the first, for example sloping downwardly, coalesced lighter phase oils and other constituents impinge upon the bottom surface of the plates and are forced to flow along the surface of those plates upwardly, against the flow of the liquid. Accordingly, the term countercurrent separation has been used to describe the process carried out in such a system. The disadvantage of the countercurrent separators is that the separated matter, either the lighter phase oils or the heavier phase solids are always travelling against the flow of the waste water, so that their progress is slowed. In addition, there is a higher tendency for turbulence and mixture of the phase flowing in the countercurrent direction. Another problem, which is more apt to occur in countercurrent separators, is clogging and agglomeration of heavy oils and solids on the surface of the plates.

A more efficient separator design is embodied in the cross-flow or co-current separators. These separators have their plates sloped normal to the direction of the flow. When several stacks of plates are used, the stacks are arranged in parallel rather than in series. The waste water to be separated enters the stack of sloped impingement plates and flows in a parallel fashion through the plates, never forced upwardly or downwardly, since the plates slope downwardly or upwardly in a direction perpendicular to the flow. Therefore, while the waste water being separated flows in a parallel fashion, the lighter phase material rises to the bottom surface of the upper impingement plates and is forced in the direction of the slope of the plates, while still flowing in the same direction of the flow. Likewise, the heavier phase material settles to the top surface of the lower impingement plates and follows the slope of the plate to the opposite side from the lighter phase material. Accordingly, both the heavy and lighter phase materials flow in the direction of the current of the waste water being separated, but in an opposite direction from each other across the surface of the plates. This type of separation process is therefore called cross-flow co-current separation. The co-current separators have the advantage of reduced turbulence and mixing of the lighter, and heavier phase components, since both components travel in generally the same direction of the waste water being treated. These separators, however, still suffer from clogging when the waste water has a large concentration of particulate matter, One example of a countercurrent separator is described in U.S. Pat. No. 4,643,834. As illustrated in FIG. 2 of the '834 patent, the flow enters into a chamber containing a number of parallel plates arranged in series. The plates are in an inverted V configuration and slope upwardly, and then downwardly for each particular set of plates. The flow, thus enters from one side first travelling upwardly and then downwardly through the plates resulting in countercurrent separation. The central portion of the plates contain apertures to allow lighter components to float upwardly and each set of plates is separated by a gap to allow heavier liquids or solids to settle. The '834 patent includes a system to analyze the make-up of the discontinuous mixture which is fed into the separator, and a monitor controls both the separation space between the plates and/or the angle of attack of a particular plate. A separation between the plates may be adjusted by mechanical means as illustrated in FIGS. 11 and 12, and the angle of attack may be adjusted by electric motors as illustrated in FIG. 8. One disadvantage of this system is that the flow travels through the central gap portion and the gaps between each set of plates, causing remixing of the separated phase, either travelling upwardly or downwardly. In addition, the mechanical systems and the construction of the plate packs is complex, expensive and cannot be easily removed from the separator for cleaning or replacement of plates.

Another type of gravitational settler is disclosed in U.S. Pat. No. 3,563,389. This settler uses at least two stacks of sloping vertically spaced plates. At the sides of each of the plates are narrow vertical channels for the rising of lighter phase components and another channel for descending of heavier phase components. The stacks of plates, however, are permanently set into the separator, and cannot easily be changed or replaced. Another drawback of this settler is that the waste water flows through the vertical channels. This flow through causes turbulence and resuspension of rising and/or descending components.

Another separator is disclosed in U.S. Pat. No. 4,273,654 in which vertically sloped plates are arranged in a basin. Individual plates are grouped in subassemblies which are permanently fixed by draw bars or other arrangements. In addition, corrugated vertical plates are used to baffle off settling areas at the edges of the basin for descending materials, and at the center of the basin for ascending materials. Individual plates, however, cannot be easily removed from each subassembly for cleaning. In addition, individual plates cannot be changed to vary the spacing between the plates or the length of the plates. Rather, each subassembly must be removed and replaced with one having a larger or smaller spacing. Additionally, in order to obtain access to subassemblies positioned at the bottom of the separator, the top subassemblies must first be removed. Also, since the baffles are arranged parallel to the direction of the flow, the flow of waste water cannot be completely sealed off from the settling and rising zones. Another disadvantage of the system is that the baffles and mounting apparatus must be fixed to the sides of the separator tank. This arrangement does not offer flexibility and ease of maintenance and cleaning. In a related patent, U.S. Pat. No. 4,054,529 a cage assembly is disclosed which may be useful for holding the corrugated plates described in the '654 patent.

Other separator devices which utilize corrugated baffles are disclosed in U.S. Pat. Nos. 3,837,501, 3,666,112 and 3,666,111. None of these devices, however, allows the easy removal and replacement of individual plates for cleaning, for varying the distances between the plates, or for changing the length of the plates. Additionally, each of the separators disclosed, requires the mounting of the plates to the side walls of the separator tank.

Other types of separators are described in U.S. Pat. Nos. 4,194,976 and 1,709,676. The first is a gravitational separator with membrane baffles, such as rubber or other elastomers which are maintained in fixed separation and a metal frame. The membranes are separately attached to the supporting structure at a fixed distance, but the distance can be altered by changing the arrangement of ropes and pins holding the membranes. The patent does not, however, disclose the capability of changing the length of individual baffles. The second patent, U.S. Pat. No. 1,709,676 describes a pulp separator which includes vertical channels for settling or rising of lighter or heavier components, respectively.

Finally, U.S. Pat. No. 4,681,683 describes plate assemblies and individual collector troughs in the assembly. The plate assemblies can be removed for cleaning and maintenance. The spacing between the plates and the length of the plates, however, are fixed in the assemblies. Also, the apparatus can only be used for countercurrent separation.

Therefore, in order to solve the shortcomings in the prior art, it is an object of the present invention to provide a modular impingement plate design which may be used for either cocurrent or countercurrent separation.

Another object of the present invention is to provide such a modular plate design which allows for ease of removal and maintenance of individual plates within such modular design.

An additional object of the present invention is to allow the varying of the spacing between individual plates in a simple and cost effective manner.

A further object of the present invention is to provide a modular separator which allows the user to vary the plate lengths, the gap between the plates, or a combination of both in a simple and cost effective manner.

A still further object of the present invention is to provide a modular separator with quiescent zones for the settling of heavier phase material and the rising of lighter phase material without the turbulence associated with the prior art designs.

SUMMARY OF THE INVENTION

These and further objects are achieved by the present invention which provides a phase separator module for insertion in a flow of fluid to be separated. The phase separator module includes a frame for retaining a plurality of impingement plates within the frame. Vertical baffling means are provided for blocking the flow of fluid to be separated, forming quiescent regions on either side of the impingement plates normal to the direction of flow of the waste water flow. The phase separator module often includes removable retention means, such as slots, for retaining the plates within the frame and allowing ease of removal of the plates for cleaning and replacement. The removable retention means also allow for manual adjustment of the gap separation between the plates to customize the phase separator modules for a particularly required separation efficiency and to the particular solids loading characteristics of the waste water.

The impingement plates are retained within the phase separator module's frame, aligned substantially parallel to the direction of flow of the fluid to be separated and oriented at a non-horizontal angle to the vertical baffles. The angle is also non-vertical and may suitably vary from about 15° to about 60° as measured from the vertical baffling means, more preferably the angle may vary from about 35° to about 55° measured from the vertical baffling means and most preferably angle may be about 45°. Of course, if the angle is measured in the opposite direction, ninety (90°) degrees should be added to these ranges.

The phase separator module may also include more than one stack of impingement plates within the frame. Preferably, the stacks of plates are arranged in a V or upside down V configuration so that one stack of impingement plate is arranged at a first non-horizontal acute angle in relation to the vertical baffle and the subsequent stack is arranged in an obtuse angle as measured from the vertical baffle. Preferably, each subsequent stack is oriented at an opposite angle to the previous stack as measured from the vertical baffle. In an alternative embodiment, the retention means within the frame includes a variable adjustment means, such as a manual or mechanical variable adjustment means for variably and continuously adjusting the spacing or gap between the plates. The arrangement of the frame of the phase separator module allows the plates to be replaced with longer or shorter impingement plates so that their length may be varied depending upon the desired efficiency of separation and the flow characteristics required for the particular application.

A phase separator apparatus which includes the phase separator modules of the present invention, may include either one or a plurality of the phase separator modules within a single separator tank. In a preferred embodiment, the phase separator module is positioned within the tank so that the front vertical baffles of the phase separator module face towards the flow of the fluid to be separated resulting in cocurrent cross-flow separation of the fluid. The phase separator modules of the present invention are especially suited for oil/water/solids phase separation. These phase separator modules, may also be placed in other types of physical, chemical, biological or electrical treatment systems to enhance the efficiency of the particular treatment process being utilized.

For a better understanding of the present invention, reference is made to the following description and examples in conjunction with the accompanying figures, the scope of which is pointed out in the appended claims.

BRIEF DESCRIPTION OF THE DRAWINGS

FIG. 1 is a perspective view of the novel phase separator module of the present invention.

FIG. 2 is a side elevational cutaway view of a phase separator containing the separator modules of the present invention.

FIGS. 5(a) and 5(b) illustrate two alternative mechanical continuous adjustment means for the phase separator module of the present invention.

FIG. 8 shows a top plan view of a relatively large phase separator apparatus with eight (8) or more phase separator modules.

DETAILED DESCRIPTION OF THE INVENTION

Figure 3:
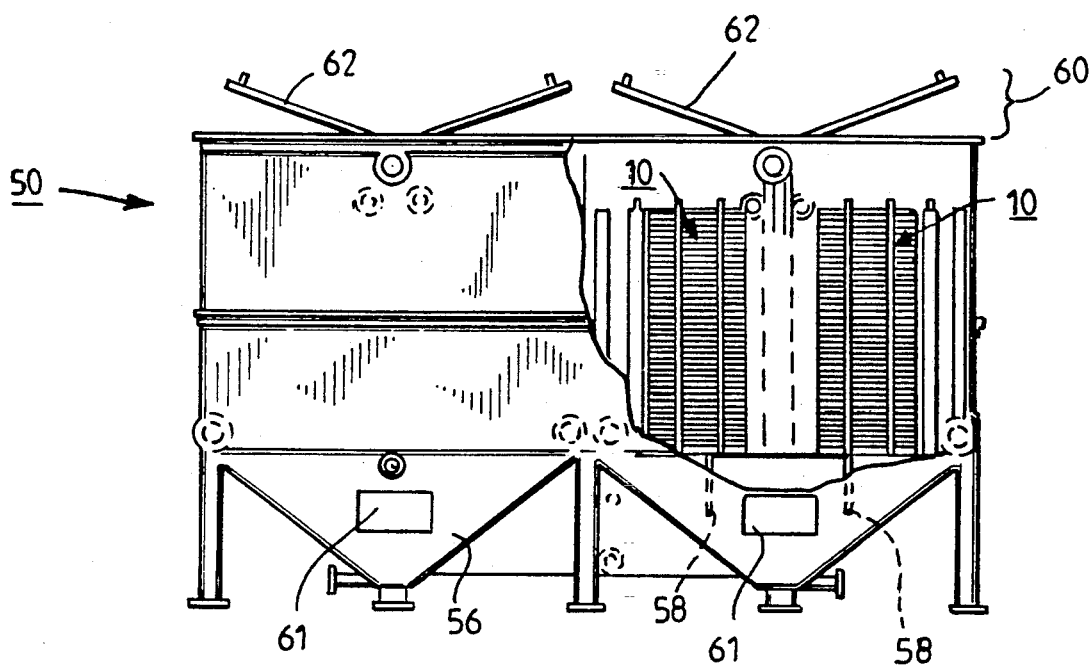
FIG. 3 is a front elevational cutaway view of a phase separator containing the separator modules of the present invention.

The novel phase separator module 10 of the present invention is illustrated in FIG. 1. As illustrated in FIG. 2, one or more of these phase separator modules 10 are placed within a tank of a phase separator apparatus 50 in accordance with the present invention. The novel phase separator module 10 includes a frame 12 which holds a plurality of parallel impingement plates 14. In the embodiment illustrated in FIG. 1, the impingement plates are held in slots 16 formed in frame 12. However, those skilled in the art may appreciate that other holding means such as pins, hooks, bayonet fittings and the like may be used instead of slots 16 to hold impingement plates 14 within a frame.

In the preferred embodiment of the phase separator module 10, illustrated in FIG. 1, two (2) stacks of plates are shown arranged in a V herringbone configuration. Alternatively, however, one stack of plates may be used in a phase separator module according to the present invention, or more than two (2) stacks may be used in such a phase separator module, in a V, W or upside down V or W configuration, or any other configuration without departing from the spirit and scope of the present invention.

The preferred two (2) stack module, illustrated in FIG. 1, offers the advantage of providing a separator module which is of acceptable dimensions for placement within most separator tanks, while being easily handleable by one operator. The module 10 includes handles 26 on the top of the frame for easy removal from a top access door 62 in a separator tank 50, like the one illustrated in FIG. 3. In the preferred phase separator module 10, the two (2) stacks of impingement plates 14 include a central vertical baffle 22(a) at the front of the module and 22(b) at the rear of the module. In addition, the phase separator module 10 includes outside vertical baffle 24(a) at the front of the module and 24(b) at the rear of the module. The vertical baffles 22, 24 include most of the slots 16 for retaining the impingement plates. The extra slots can be used to insert additional impingement plates, thereby increasing efficiency without replacing the entire separator module. Additionally, the impingement plates can be replaced with longer or shorter plates, thereby varying efficiency, again, without replacing the entire separator module. Additional slots 16 are also positioned at the top and bottom frame members 28(a) and 28(b), respectively, for retaining the shorter uppermost and lowermost plates 16 which do not reach entirely across the frame 12. Corner braces 30 are used to hold the frame together, and additional cross bracing between the outside vertical baffles may be used to add rigidity, if needed. Additionally, the phase separator module may include feet and sump baffles 58 (not shown) at the bottom of the module to raise the module to a required distance from the bottom surface of the separator tank and provide an area for settling of solids in a flat bottom separator.

Figure 4:
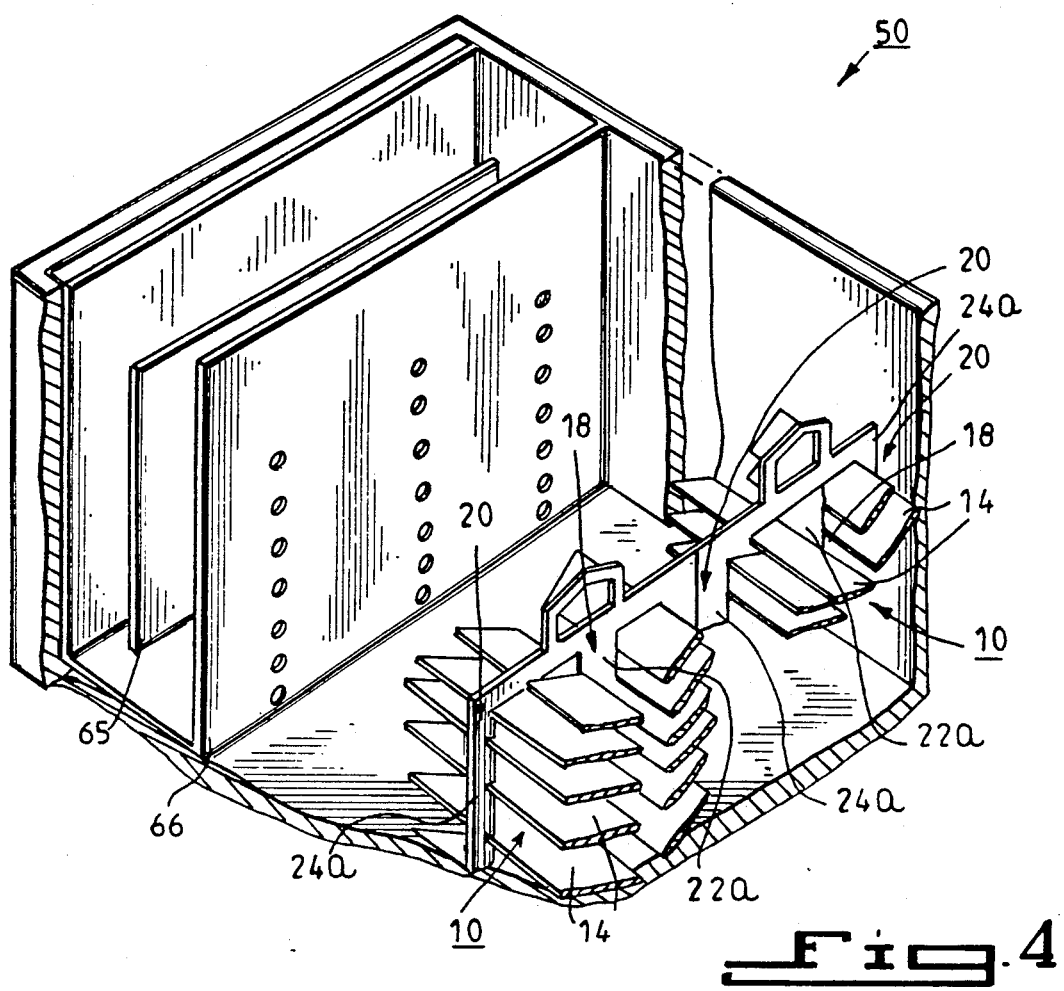
FIG. 4 is a breakaway perspective view showing the inside of a phase separator containing the separator modules of the present invention.
Figure 6:
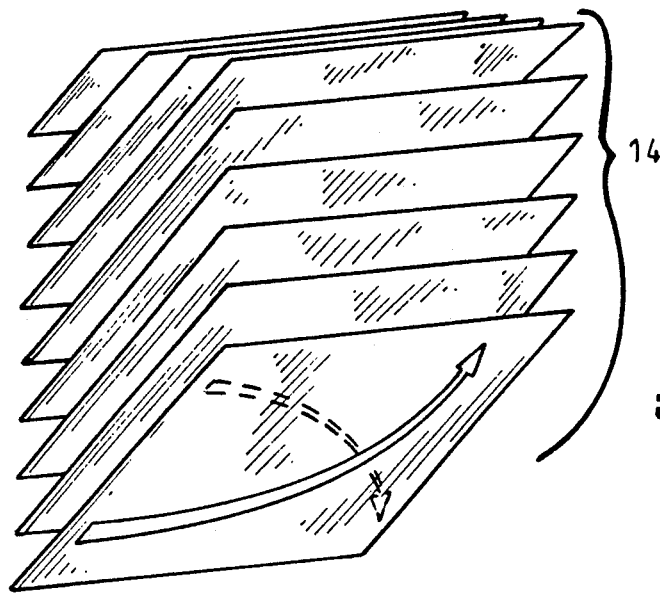
FIG. 6 is a schematic illustration of cocurrent cross-flow separation across impingement plates, with the frame removed for the purpose of illustration.

The vertical baffles 22 and 24 provide a substantial benefit when the phase separator module 10 is used preferred cocurrent orientation. When the separator module 10 is placed in the cocurrent orientation, the vertical baffles 22 and 24 face towards the direction of the flow of waste water and, therefore, define vertical "chimneys" 18 and 20 within the phase separator module 10. The central chimney 18, as better shown in FIG. 4, is defined between the front central vertical baffle 22(a) and the rear central vertical baffle 22(b). Chimney 18 provides, in the V herringbone configuration illustrated in FIGS. 1 and 4, a settling zone for solids and heavier phase materials. Likewise, when facing in the direction of flow of the waste water, the outside vertical baffles 24(a) and 24(b) provide outside "chimney" zones for rising oils, as well as other lighter than water phase fluids and particles. If the phase separator module 10 is configured so that the impingement plates are in an upside down V configuration, the central "chimney" 18 would be for lighter phase and particles to rise to the top of the separator while the exterior "chimneys" 20 would be for settling particles and heavier phase fluids. Only the front vertical baffles are absolutely necessary for forming the "chimney" regions. Although, it is preferred to include both a front and rear vertical baffles for imparting added structural stability to the module. Additional vertical baffles may be added in the "chimney" regions, if desired, for added structural rigidity or to further maintain the non-turbulent quiescent nature of the "chimney" region without departing from the scope of the present invention.

Stacks of impingement plates are preferably arranged relative to subsequent stacks in a V or upside-down V configuration within the frame 12 of the phase separator module 10 forming one or more stacks of parallel plates, separated by approximately equal distance from each other. The slots 16 in the frame allow ease of removal of the individual plates for cleaning and maintenance. In addition, the spacing between the plates may be varied, depending on the desired efficiency of separation, and the type of waste water to be treated. If a high solids content is present in the waste water, there is a greater tendency for clogging of the plates. In such cases, larger spacing may be desired between the plates at the bottom of the phase separator module while smaller spacing may be utilized near the top of the module to increase efficiency of separation in areas where a lower solids content is present. Conversely, if the solids are somewhat lighter than water, the spacing near the top of the phase separator module may be increased while the spacing near the middle or bottom may be decreased for higher efficiency. Thus, a variety of other arrangements of the spacing between the plates may be used, as may be routinely determined by those having ordinary skill in the art, under different waste water treatment conditions.

The impingement plates of the present invention are preferably smooth, flat and constructed from an oleophilic material such as solid polypropylene for lighter weight, lower cost and improved corrosion properties. The plates may also be constructed from stainless steel or other noncorroding metals. Although it is possible to arrange the plates in a non-parallel fashion within frame 12 the preferred embodiment of the present invention is a parallel plate arrangement with two "mirror-image" stacks either in a V or upside down V herringbone configuration retained within a single frame 12.

While flat impingement plates are preferred, impingement plates having a waffle or wavy design may also be used in the phase separator module of the present invention with satisfactory results. The flat parallel plate embodiment, however, is preferred since it permits minimum turbulence in the fluid travelling between and across the plates. When turbulence is minimized and velocity is maintained at a low level, the rate of phase separation can be optimized. The preferred flat parallel plate design of the present invention, thus, assures non-turbulent flow through the impingement plates.

The relative angle of the impingement plates 14 in relation to the central vertical baffle may vary from about 15° to about 60°, or from about 115° to about 155°, depending from which direction the angle is measured. The more suitable angle is from about 35° to about 55°, or from about 125° to about 145°, again depending from which direction the angle is measured. The most preferred angle, however, is about 45° or about 135°, again depending on the direction form which the angle is measured. The 45° (or 135°) angle facilitates optimum efficiency of phase separation, under most situations both for rising and settling matter.

The novel phase separator module 10 of the present invention can, of course, be used in a countercurrent arrangement with the two stacks of plates oriented in series with respect to the direction of flow. Accordingly, the flow would enter from the direction of the previously described exterior "chimney" region 20. Such a countercurrent arrangement, would take full advantage of the modularity features of the phase separator module 10 of the present invention, including the ease of maintenance and flexibility of replacement of the modules. Use of the module in the countercurrent orientation would not, however, take advantage of the quiescent "chimney" 19 and 20 regions of the present invention for the undisturbed settling and rising of separated matter. Rather, the waste water would necessarily flow across these chimney regions.

Preferably, the novel phase separator module 10 of the present invention is arranged in a cocurrent orientation so that the front central vertical baffle 22(a) and front outside vertical baffles 24(a) face towards the direction of the waste water flow. In such arrangement, the flow of waste water is blocked by the front baffles 22(a) and 24(a). The remaining waste water flows in a parallel, non-turbulent fashion across the impingement plates 14 from the front of the phase separator module 10 towards the rear. While water flows directly across the plates, as a plug flow in approximately a straight line, the lighter phase materials such as oil and lighter than water solids rise and impinge upon the bottom surface of the plates, as illustrated in FIG. 4 by the solid arrow. The lighter phase agglomerates on the surface of plates and travel in a curved fashion across the of the plates until it reaches the quiescent outside baffled "chimney" zone 20. When the droplets break away from the impingement plates 14 in the quiescent "chimney" zone 20 they rise, unhindered by turbulence and without the risk of shear forces breaking and re-emulsifying the droplets Once at the top of the surface, the lighter phase material, such as oil may be removed by automatic skimming mechanisms, such as skim pipes and may be directed into a storage tank with a level alarm. Solids and droplets of heavier phase fluids settle to the top of the impingement plates 14 and travel across the plates towards the quiescent "chimney" settling zone 18 in the center of the phase separator module 10. Once the heavier droplets and particles enter the quiescence "chimney" settling zone 18, they quickly settle to the bottom of the separator tank, as illustrated in FIG. 3 for collection in cone-bottom hoppers 56 for automatic semiautomatic removal. Hopper baffles 58 may be used to eliminate any "short-circuiting" of waste water flow through the solids holding area.

In small separators 50, when only one phase separator module 10 is used, the outside vertical baffles are preferably designed to contact either side of the wall of the tank. Alternatively, a protruding baffle portion may be used to prevent "short-circuiting" around the phase separator module 10. In larger units, as illustrated in FIG. 4, more than one phase separator modules 10 are arranged side-by-side with the outside vertical baffles 24 either touching, thus forming one "chimney" zone between them, or an additional baffle should be placed between the two outside vertical baffles to form an extended "chimney region". Either way, such side-by-side arrangement should prevent short-circuiting of waste water around the phase separator modules 10. Because of the novel frame 12 of the phase separator module 10, the plate widths, i.e. the distance between the central and outside vertical baffles, can be left short to prevent solids from building up and possibly binding to the impingement plates. Since the frame 12 has less of a depth, i.e., separation between the front and rear vertical baffles, various length impingement plates 14 may be utilized. The length of the plates must, however, be as long or longer than the separation or depth between the respective plate retention means 16 on the front and rear baffles.

Preferably the frames 12 of the phase separator module 10 are constructed from stainless steel bars ¼ inch thick and the plates are made from polypropylene. The slots 16 or other retention means for holding the plates are suitably positioned approximately one inch apart along the length of the vertical baffles 22 and 24 and along the top and bottom portions 28(a) and (b) of the frame. The separation between the front and rear of the frame preferably is about 1½ feet, but it may be varied for each particular application, as desired. The impingement plates may vary in length from approximately 1½ feet, if that is the minimum frame separation being utilized, up to 2 or 3 feet in length or longer if required. Accordingly, any one frames may support impingement plates which are the same size or longer than the separation between the front and rear vertical baffles of the frame, i.e., the plates depth may be from about 1½ feet to over 4 feet if required. The gap between the plates may be varied anywhere from less than 1 inch, to 4 or 5 or whatever gap separation distance is desired based on the optimum efficiency for the particular waste water and the percent of solids loading in the waste water stream. Generally, the lower the separation gap between the plates 12, and the longer the plate length, the higher the efficiency of separator. However, with increased plate length and with decreased plate gaps, there is a higher chance of clogging when high percentages of solids or tacky materials are present in the waste water. Accordingly, the plate gap separations and plate lengths can be customized in accordance with the present invention, for the particular waste water conditions being treated.

Increased plate length in the phase separator module, at the same flow rate, results in increased detention time of the waste water between the impingement plates. Additionally, decreased plate gap separation, permits further impingement of slow rising, i.e. smaller diameter or higher specific gravity lighter phase droplets, at the same flow rate. Accordingly, increasing the plate length or decreasing the gap between the plates, or a combination of both, provide increased efficiency in the removal of separated phase under the same flow conditions.

The phase separator modules of the present invention may also be arranged in series, one after another to mimic the efficiency of separators having much longer plates, forming a much longer phase separating region. Additionally, the phase separator modules 10 may be stacked one on top of another with suitably adapted handles 26 in the lower modules to form vertically higher/deeper impingement regions. Thus, the phase separator modules 10 of the present invention offer a great deal of flexibility in separator tank design to facilitate various applications.

In an alternative embodiment illustrated in FIGS. 5(a) and 5(b) the spacing between the plates 14 may be continuously adjusted using suitable mechanical adjustment means 32 or 34. Another continuous vertical adjustment means may utilize a "venetian-blind" like arrangement (not illustrated), or a criss-cross scissor-jack like side frame (not illustrated) for variable and continuous adjustment of the spacing between the plates. Accordingly, suitable mechanical adjustment means may be chosen by those skilled in the art and adapted for particular use without departing from the spirit or the scope of the present invention. Preferably, such continuously adjustable phase separator modules include the vertical baffles on either side of the impingement plates to provide the quiescent "chimney" zones 18 and 20 of the present invention.

A typical phase separator apparatus 50 which utilizes the novel phase separator modules 10 of the present invention is illustrated in FIG. 2. The side wall of the phase separator 50 is partially broken away to show the two phase separator modules 10. The modules 10 are shown oriented side-by-side, in parallel in relation to the direction of the current of waste water to be separated. A skimmer 52 is shown above the separator modules 10 and includes a number of side skim pipes 54 which extend into the exterior "chimney" regions 20 between each of the phase separator modules 10. Phase separator apparatus 50 also includes cone shaped hopper or sump regions 56 for collecting heavier phase materials and settled solids The oil and lighter phase materials rise and are removed by the adjustable, automatic skim pipes 54 and flow by gravity into an integral oil storage tank with level alarm (not shown). The solids and heavier phase materials fall into the cone shaped sump 56 for removal. Solids removal may be by manual, automatic, or suitable semiautomatic means. A front elevational cutaway view of the phase separator apparatus 50 is shown in FIG. 3. As illustrated in FIG. 3 hopper or sump baffles 58 extend into the sump 56 to prevent any "short-circuiting" of waste water flow through the sump region. Large access ports 61 are provided for access into the sump region. A sturdy cover 60 with individual doors 62 with piano hinges (not illustrated) allows total accessibility into the phase separator 50 for easy removal of the phase separator modules 10 servicing and cleaning.

Figure 7A:
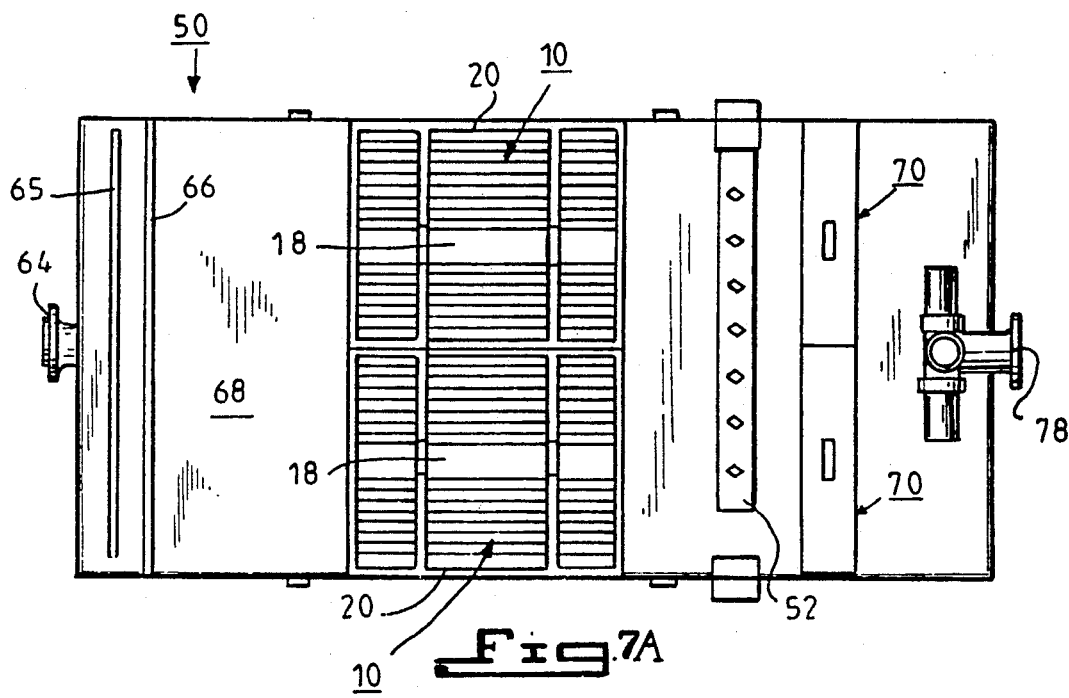
FIGS. 7(a) and 7(b) are simplified schematics of a phase separator apparatus as seen from (a) a top plan view with the cover removed, and (b) a side elevational view with the side wall removed to show the interior.
Figure 7B:
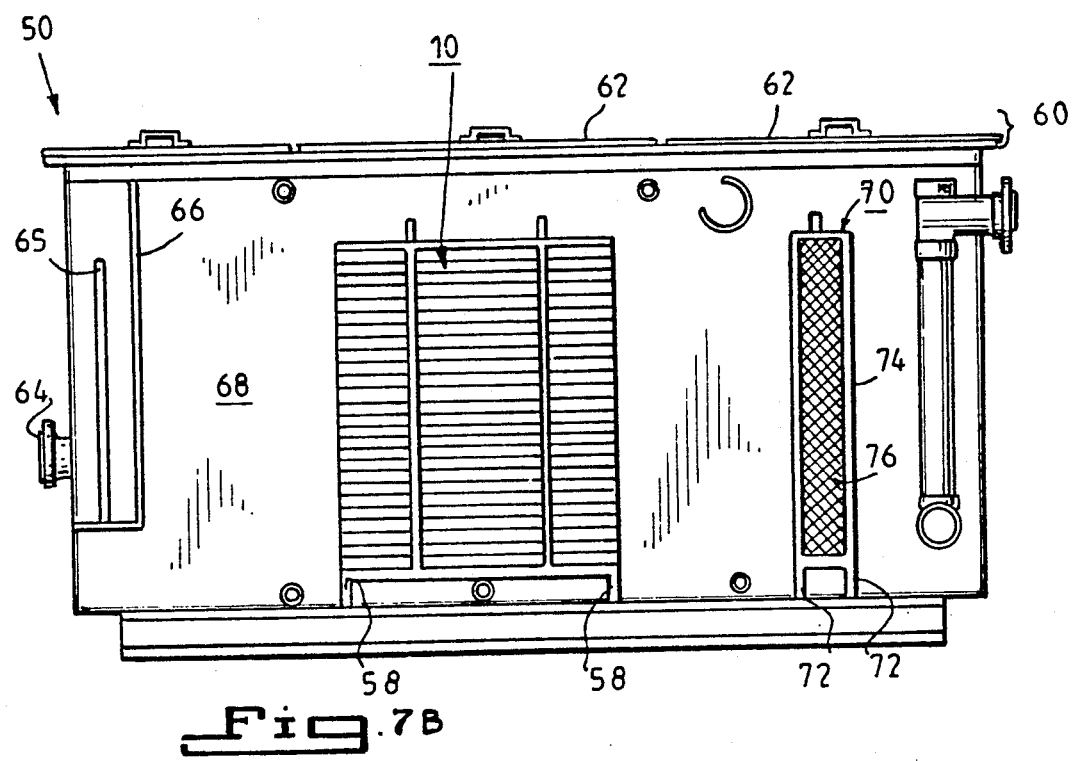

FIG. 7 is a simplified schematic of a phase separator apparatus 50 having two phase separator modules 10 aligned in parallel FIG. 7(a) is a top plan view of the separator with the cover 60 removed, while FIG. 7(b) is a side elevational view of the phase separator apparatus 50 with the side wall removed to show the interior (the sump region is not illustrated). The waste water enters inlet port 64 and travels around baffle 65 to baffle 66 to assure uniform flow distribution while minimizing the turbulence and energy in the waste water flow. Distribution baffle 66 is perforated in order to distribute the flow evenly across the entire separator. Turbulence through the perforations is diminished by standard velocity damping plates positioned over the perforations and attached to baffle 66 (not illustrated).

After passing around the inlet baffle 65 and through baffle 66, the waste water flows into a corse separating zone 68. In the corse separating zone 68 large oil droplets and large solids are allowed to separate. This zone is important for three reasons. 1) to remove gross oil and solids, 2) to further distribute the flow over the entire entry area of the phase separator modules 10, and 3) to reduce the oil and solids loading in the modular phase separators 10. Optionally, high surface area materials (HSA) usually manufactured from polypropylene materials may be placed in the corse separating zone 68, immediately before the phase separator module 10, in order to convert extremely small oil droplets from high surface area stable suspensions to larger droplets having lower stability in the water. These HSA materials are well-known to those of ordinary skill in the art and are commercially widely available to the trade.

The flow of waste water then enters the phase separator module 10 over a wide entry area and travels between and across the impingement plates 14. The large entry area of the phase separator module 10 allows a low velocity non-turbulent flow between the impingement plates 14. The flow of waste water, however, is blocked by the front central vertical baffles 22(a) and front outside vertical baffles 24(a) from travelling directly through the central and exterior "chimney" zones 18 and 20, respectively. The waste water travels in a parallel fashion between and across the impingement plates 14 allowing removal of lighter phase material such as small oil droplets as previously discussed The large hydraulic impingement area of the plates reduces the turbulence between the plates allowing proper phase separation.

As described previously, the lighter phase material such as coalesced oils rise to the top through the outside "chimney" zones 20 and are collected by the skim pipes 54. The heavier phase materials and solids flow downwards towards the central "chimney" zones 18 and settle into the sump 56 for collection. The treated waste water, the lighter and heavier phase materials having been removed, flows out of the rear portion of the phase separator module 10 into an optional secondary purification region which may contain a secondary coalescer 70 containing interwoven HSA mesh of fibrous polypropylene 76 in a rigid metal housing 74. The secondary coalescers are easily removable and are cleanable for reuse. The secondary coalescers like the phase separator modules, preferably include sump baffles 72 to prevent "short circuiting" of the waste water around the coalescers.

The treated waste water is then removed through an outlet port 78 for additional treatment or disposal. As well-known to those skilled in the art additional water treatment means may be disposed either before or after the phase separator 50 of the present invention to either pretreat or further purify the waste water treated by the phase separator 50 of the present invention. Additionally, use of the novel phase separator modules 10 of the present invention is not limited to use in oil-water or other phase separation apparatus. Rather, the phase separator modules may be placed in other types of purifiers, chemical or biological treatment tanks, clarifiers, and agglomerators to enhance the particular purification or treatment process being utilized.

Figure 9:
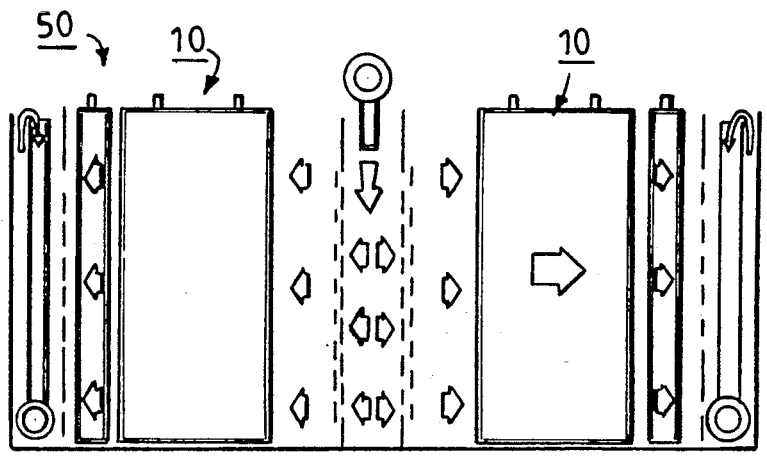
FIG. 9 is a flow schematic of two phase separator modules, as shown in FIG. 8.

A relatively large phase separator apparatus 50 which includes at least 16 phase separator modules 10 is illustrated in FIG. 8. The phase separator modules are arranged in two parallel sections which can be individually closed off for servicing while leaving the other side undisturbed. A flow schematic of each section of the modules is illustrated in FIG. 9.

Thus, while we have described what are the presently contemplated preferred embodiments of the present invention, further changes and modifications could be made by those skilled in the art without departing from the scope of the invention, and it is contemplated to claim all such changes and modifications.

We claim:

1. An improved separator apparatus for separation of mixtures of liquids and suspended particles, which comprises a separation tank having an inlet for introduction of the liquid containing the mixture being separated, outlets for the separated components of the liquid, and an impingement separation means having impingement plates for insertion in the flow of the liquid containing mixture to be separated, the improvement comprises:
said impingement separation means comprising a phase separator module for insertion in the flow of liquid containing mixture to be separated, said phase separator module including,
a self-supporting frame for retaining a plurality of rigid impingement plates,
a plurality of rigid impingement plates retained within said frame, and
removable retention means for removably retaining the impingement plates within the frame.

2. An improved separator apparatus as recited in claim 1, wherein said frame further includes means for forming a quiescent region on either side of said impingement plates normal to the direction of flow of said liquid containing mixture to be separated, which includes vertical baffling means for blocking the flow of liquid to be separated.

3. An improved separator apparatus as recited in claim 1, wherein said retention means of said frame includes a plurality of slots in said frame.

4. An improved separator apparatus as recited in claim 3, wherein said impingement plates are retained in said frame substantially parallel to the direction of flow the liquid to be separated, and at a non-horizontal angle to said vertical baffling means.

5. An improved phase separator apparatus as recited in claim 4, wherein said angle is non-vertical.

6. An improved phase separator appeals as recited in claim 5, wherein said angle is from about 105° to about 165° as measured from the said vertical baffling means.

7. An improved phase separator apparatus as recited in claim 5, wherein said angle is from about 125° to about 145° as measured from the said vertical baffling means.

8. An improved phase separator apparatus as recited in claim 5, wherein said angle is about 135° as measured from the said vertical baffling means.

9. An improved phase separator apparatus as recited in claim 1, wherein said separator module includes more than one stack of said impingement plates retained within said frame.

10. An improved phase separator apparatus as recited in claim 9 wherein each said stacks of said impingement plates is arranged at said non-horizontal angle to a vertical baffling means for blocking the flow of liquid to be separated on either side of said impingement plates, normal to the direction of the flow of the liquid, and wherein one stack is arranged at an acute angle and the subsequent stack is arranged at an obtuse angle to said vertical baffling means.

11. An improved phase separator apparatus as recited in claim 10, wherein each of said subsequent adjacent stacks are at opposite angles to said vertical baffling means.

12. An improved phase separator apparatus as recited in claim 11, wherein said retention means includes a variable adjustment means for variably adjusting the spacing between said plates.

13. An improved separator apparatus as recited in claim 1, further comprising a cover on said separator tank which allows accessibility to and removal of the phase separator module for servicing and cleaning.

14. An improved separator apparatus as recited in claim 13, wherein said cover comprises doors on the top of said separation tank.

15. An improved separator apparatus as recited in claim 1, wherein said phase separator module further comprises handles on the top of said frame for removal of said phase separator module from said tank.

16. An improved separator apparatus as recited in claim 2, further comprising a cover on said separator tank which allows accessibility to and removal of the phase separator module for servicing and cleaning.

17. An improved separator apparatus as recited in claim 16, wherein said cover comprises doors on the top of said separation tank.

18. AN improved separator apparatus as recited in claim 2, wherein said phase separator module further comprises handles on the top of said frame for removal of said phase separator module from said tank.

19. A process for separating a mixture of liquids and suspended particles comprising:
   a) directing the flow of the liquids and suspended particles to be separated into an inlet in a tank of a phase separator apparatus;
   b) directing the liquids and suspended particles to be separated towards a phase separator module placed in the flow path of the liquids and suspended particles to be separated, wherein the phase separator module includes a self supporting frame for retaining a plurality of impingement plates, a plurality of rigid impingement plates retained within the frame, and removable retention means for removably retaining said plates within said frame; and
   c) allowing the components of the fluid to be removed on the basis of their density, heavier particles being removed from a lower sump region, less dense phase being removed from an upper float region and the intermediate phase being removed from a liquid outlet region.

20. A process as recited in claim 19, wherein said frame further includes means for forming a quiescent region on either side of said impingement plates normal to the direction of flow of said mixture of liquids and suspended particles to be separated, which includes vertical baffling means for blocking the flow of said mixture of liquids and suspended particles to be separated.

21. A process as recited in claim 19, wherein said retention means of said frame includes a plurality of slots in said frame.

22. A process as recited in claim 21, wherein said impingement plates are retained in said frame substantially parallel to the direction of flow of the mixture of liquids and suspended particles to be separated, and at a non-horizontal angle to said vertical baffling means.

23. A process as recited in claim 22, wherein said angle is non-vertical.

24. A process as recited in claim 23, wherein said angle is from about 105° to about 165° as measured from the said vertical baffling means.

25. A process as recited in claim 23, wherein said angle is from about 125° to about 145° as measured from the said vertical baffling means.

26. A process as recited in claim 23, wherein said angle is about 135° as measured from the said vertical baffling means.

27. A process as recited in claim 19, wherein said separator module includes more than one stack of said impingement plates retained within said frame.

28. A process as recited in claim 27, wherein each said stacks of said impingement plates is arranged at said non-horizontal angle to a vertical baffling means for blocking the flow of the mixture of liquids and suspended particles to be separated on either side of said impingement plates, normal to the direction of the flow of the mixture of liquids and suspended particles, and wherein one stack is arranged at an acute angle and the subsequent stack is arranged at an obtuse angle to said vertical baffling means.

29. A process as recited in claim 28, wherein each of said subsequent adjacent stacks are at opposite angles to said vertical baffling means.

30. A process as recited in claim 29 wherein said retention means includes a variable adjustment means for variably adjusting the spacing between said plates.

31. A process as recited in claim 19, further comprising selectively removing impingement plates from said frame to alleviate blocking.

32. A process as recited in claim 19, further comprising selectively inserting impingement plates to said frame to improve separation efficiency.

33. The process recited in claim 31, further comprising selectively inserting impingement plates to said frame to improve separation efficiency.

34. The process recited in claim 30, further comprising variably adjusting the spacing between the plates to alleviate blocking when spacing between the plates is increased, or improve separation efficiency when spacing between the plates is reduced.

35. A process as recited in claim 19, further comprising removing said phase separator module from said tank for servicing and cleaning through a cover on the top of said tank.

36. A process as recited in claim 20, further comprising removing said phase separator module for servicing and cleaning through a cover on the top of said tank by means of handles on the top of the frame of said phase separator module.

* * * * *

UNITED STATES PATENT AND TRADEMARK OFFICE
CERTIFICATE OF CORRECTION

PATENT NO.  : 5,173,195
DATED       : December 22, 1992
INVENTOR(S) : Wright et al.

It is certified that error appears in the above-identified patent and that said Letters Patent is hereby corrected as shown below:

| | |
|---|---|
| Column 7, Line 58, | now reads "under most situations", should read --under most situations,--; |
| Column 8, Lines 23-24, | now read "plates and travel in a curved fashion across the of the plates", should read --the plates and travel in a curved fashion across the surface of the plates--; |
| Column 8, Line 29, | now reads "the droplets Once", should read --the droplets. Once--; |
| Column 8, Line 41, | now reads "automatic semiautomatic", should read --automatic or semiautomatic--; |
| Column 10, Line 14, | now reads "settled solids The", should read --settled solids. The--; |

UNITED STATES PATENT AND TRADEMARK OFFICE
CERTIFICATE OF CORRECTION

PATENT NO. : 5,173,195
DATED : December 22, 1992

Page 2 of 3

INVENTOR(S) : Wright et al.

It is certified that error appears in the above-identified patent and that said Letters Patent is hereby corrected as shown below:

Column 11, Lines 7-8, now read "previously discussed The", should read --previously discussed. The--;

Column 11, Lines 20-21, now read "coalescer 70 containing", should read --coalescer 70, containing--;

Column 11, Line 31, now reads "in the art additional", should read --skilled in the art, additional--; and Column 11, Line 33, now reads "invention to", should read --invention, to--.

UNITED STATES PATENT AND TRADEMARK OFFICE
CERTIFICATE OF CORRECTION

PATENT NO. : 5,173,195

DATED : December 22, 1992

INVENTOR(S) : Wright et al

It is certified that error appears in the above-identified patent and that said Letters Patent is hereby corrected as shown below:

```
Column 12, Claim 4, lines 3-4, now read "direction of flow the", should
                            read --direction of flow of the--; and
Column 13, Claim 18, line 1, now reads "AN improved", should read
                            --An improved--.
```

Signed and Sealed this

Twenty-third Day of November, 1993

*Attest:*

BRUCE LEHMAN

*Attesting Officer*    Commissioner of Patents and Trademarks

REEXAMINATION CERTIFICATE (3113rd)

United States Patent [19]
Wright et al.

[11] B1 5,173,195
[45] Certificate Issued *Jan. 28, 1997

[54] PHASE SEPARATOR MODULE

[75] Inventors: Francis C. Wright, Yardville; David A. Goding, Dover, both of N.J.

[73] Assignee: Mercer International, Inc., Mendham, N.J.

Reexamination Request:
No. 90/003,848, May 26, 1995

Reexamination Certificate for:
Patent No.: 5,173,195
Issued: Dec. 22, 1992
Appl. No.: 693,338
Filed: Apr. 29, 1991

[*] Notice: The portion of the term of this patent subsequent to Jul. 2, 2008, has been disclaimed.

Certificate of Correction issued Nov. 23, 1993.

Related U.S. Application Data

[63] Continuation of Ser. No. 484,682, Feb. 23, 1990, Pat. No. 5,028,333.

[51] Int. Cl.⁶ .................................................. B01D 21/00
[52] U.S. Cl. ......................... 210/802; 210/237; 210/521; 210/522
[58] Field of Search ................................ 210/802, 521, 210/522

[56] References Cited

U.S. PATENT DOCUMENTS

| | | |
|---|---|---|
| 1,709,676 | 4/1929 | Martyn . |
| 3,563,389 | 2/1971 | Mizrahi et al. . |
| 3,615,025 | 10/1971 | Rice et al. . |
| 3,666,111 | 5/1972 | Pielkenrood et al. . |
| 3,666,112 | 5/1972 | Pielkenrood et al. . |
| 3,741,401 | 6/1973 | Hsiung . |
| 3,837,501 | 9/1974 | Pielkenrood . |
| 3,847,813 | 11/1974 | Castelli . |
| 4,014,669 | 3/1977 | Thompson et al. . |
| 4,054,529 | 10/1977 | Pielkenrood . |
| 4,056,477 | 11/1977 | Ravitts ................................... 210/522 |
| 4,194,976 | 3/1980 | Robinsky . |
| 4,273,654 | 6/1981 | Pielkenrood . |
| 4,333,835 | 6/1982 | Lynch ..................................... 210/522 |
| 4,346,005 | 8/1982 | Zimmerman . |
| 4,544,487 | 10/1985 | Bosniak . |
| 4,643,834 | 2/1987 | Batutis . |
| 4,681,683 | 7/1987 | Lindstol . |
| 4,717,475 | 1/1988 | Brandy et al. . |
| 4,747,196 | 5/1988 | Moir . |
| 4,919,812 | 4/1990 | Lasson . |
| 5,028,333 | 7/1991 | Wright et al. ........................... 210/521 |
| 5,173,195 | 12/1992 | Wright et al. ........................... 210/802 |

Primary Examiner—Peter A. Hruskoci

[57] ABSTRACT

A phase separator apparatus is disclosed which utilizes phase separator modules for insertion in a separation tank. The modules include a frame for retaining a plurality of impingement plates within the frame utilizing removable retention means, such as slots, allowing easy removal and replacement of the impingement plates. The phase separator module also includes vertical baffles for blocking the flow of fluid to be separated and forming a quiescent region on either side of the impingement plates normal to the direction of flow to the fluid to be separated. The removable retention means, such as slots in the frame, not only allow removal for cleaning and maintenance of the plates, but also provide a means for adjusting the spacing of the gap between the plates, the plate length or a combination of both, in order to modify the efficiency of the separator. The phase separator modules of the present invention are especially suited for cocurrent cross-flow separation of a multiphase aqueous mixture, such as that of oil, water and suspended solids.

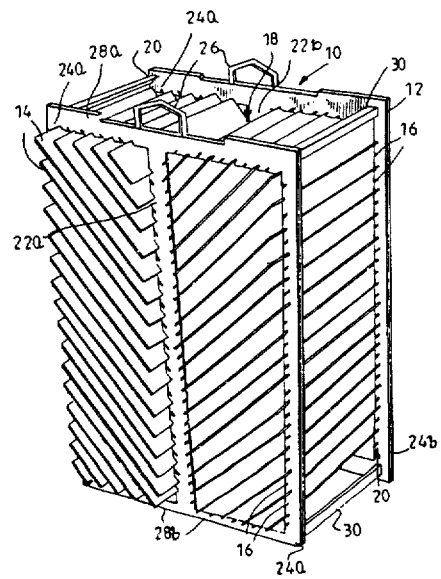

B1 5,173,195

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 48–59:

The relative angle of the impingement plates 14 in relation to the central vertical baffle may vary from about 15° to about 60°, or from about 115° to about 155°, depending from which direction the angle is measured. The more suitable angle is from about 35° to about 55°, or from about 125° to about 145°, again depending from which direction the angle is measured. The most preferred angle, however, is about 45° or about 135°, again depending on the direction [form] *from* which the angle is measured. The 45° (or 135°) angle facilitates optimum efficiency of phase separation, under most situations, both for rising and settling matter.

Column 8, lines 8–43:

Preferably, the novel phase separator module 10 of the present invention is arranged in a cocurrent orientation so that the front central vertical baffle 22(a) and front outside vertical baffles 24(a) face towards the direction of the waste water flow. In such arrangement, the flow of waste water is blocked by the front baffles 22(a) and 24(a). The remaining waste water flows in a parallel, non-turbulent fashion across the impingement plates 14 from the front of the phase separator module 10 towards the rear. While water flows directly across the plates, as a plug flow in approximately a straight line, the lighter phase materials such as oil and lighter than water solids rise and impinge upon the bottom surface of the plates, as illustrated in FIG. 4 by the solid arrow. The lighter phase agglomerates on the surface of the plates and travel in a curved fashion across the surface of the plates until it reaches the quiescent outside baffled "chimney" zone 20. When the droplets break away from the impingement plates 14 in the quiescent "chimney" zone 20 they rise, unhindered by turbulence and without the risk of shear forces breaking and re-emulsifying the droplets. Once at the top of the surface, the lighter phase material, such as oil may be removed by automatic skimming mechanisms, such as skim pipes and may be directed into a storage tank with a level alarm. Solids and droplets of heavier phase fluids settle to the top of the impingement plates 14 and travel across the plates towards the quiescent "chimney" settling zone 18 in the center of the phase separator module 10. Once the heavier droplets and particles enter the quiescence "chimney" settling zone 18, they quickly settle to the bottom of the separator tank, as illustrated in FIG. 3 for collection in cone-bottom hoppers 56 for automatic or semiautomatic removal. Hopper baffles 58 may be used to eliminate any "short-circuiting" of waste water flow through the solids holding area.

Column 9, lines 1–31:

Preferably the frames 12 of the phase separator module 10 are constructed from stainless steel bars ¼ inch thick and the plates are made from polypropylene. The slots 16 or other retention means for holding the plates are suitably positioned approximately one inch apart along the length of the vertical baffles 22 and 24 and along the top and bottom portions 28(a) and (b) of the frame. The separation between the front and rear of the frame preferably is about 1½ feet, but it may be varied for each particular application, as desired. The impingement plates may vary in length from approximately 1½ feet, if that is the minimum frame separation being utilized, up to 2 or 3 feet in length or longer if required. Accordingly, any one [frames] *frame* may support impingement plates which are the same size or longer than the separation between the front and rear vertical baffles of the frame, i.e., the plates depth may be from about 1½ feet to over 4 feet if required. The gap between the plates may be varied anywhere from less than 1 inch, to 4 or 5 *inches* or whatever gap separation distance is desired based on the optimum efficiency for the particular waste water and the percent of solids loading in the waste water stream. Generally, the lower the separation gap between the plates 12, and the longer the plate length, the higher the efficiency of *the* separator. However, with increased plate length and with decreased plate gaps, there is a higher chance of clogging when high percentages of solids or tacky materials are present in the waste water. Accordingly, the plate gap separations and plate lengths can be customized in accordance with the present invention, for the particular waste water conditions being treated.

Column 10, lines 1–30 and 46–62:

A typical phase separator apparatus 50 which utilizes the novel phase separator modules 10 of the present invention is illustrated in FIG. 2. The side wall of the phase separator 50 is partially broken away to show the two phase separator modules 10. The modules 10 are shown oriented side-by-side, in parallel in relation to the direction of the current of waste water to be separated. A skimmer 52 is shown above the separator modules 10 and includes a number of side skim pipes 54 which extend into the exterior "chimney" regions 20 between each of the phase separator modules 10. Phase separator apparatus 50 also includes cone shaped hopper or sump regions 56 for collecting heavier phase materials and settled solids. The oil and lighter phase materials rise and are removed by the adjustable, automatic skim pipes 54 and flow by gravity into an integral oil storage tank with level alarm (not shown). The solids and heavier phase materials fall into the cone shaped sump 56 for removal. Solids removal may be by manual, automatic or suitable semiautomatic means. A front elevational cutaway view of the phase separator apparatus 50 is shown in FIG. 3. As illustrated in FIG. 3 hopper or sump baffles 58 extend into the sump 56 to prevent any "short-circuiting" of waste water flow through the sump region. Large access ports 61 are provided for access into the sump region. A sturdy cover 60 with individual doors 62 with piano hinges (not illustrated) allows total accessibility into the phase separator 50 for easy removal of the phase separator modules 10 *for* servicing and cleaning.

After passing around the inlet baffle 65 and through baffle 66, the waste water flows into a [corse] *coarse* separating zone 68. In the [corse] *coarse* separating zone 68 large oil droplets and large solids are allowed to separate. This zone is important for three reasons. 1) to remove gross oil and solids, 2) to further distribute the flow over the entire entry area of the phase separator modules 10, and 3) to reduce the oil and solids loading in the modular phase separators 10. Optionally, high surface area materials (HSA) usually manufactured from polypropylene materials may be placed in the [corse] *coarse* separating zone 68, immediately before the phase separator module 10, in order to convert extremely small oil droplets from high surface area stable suspensions to larger droplets having lower stability in water. These HSA materials are well-known to those of ordinary skill in the art and are commercially widely available to the trade.

Column 10, line 63 through column 11, line 10:

The flow of waste water then enters the phase separator module 10 over a wide entry area and travels between and across the impingement plates 14. The large entry area of the phase separator module 10 allows a low velocity non-turbulent flow between the impingement plates 14. The flow of waste water, however, is blocked by the front central vertical baffles 22(a) and front outside vertical baffles 24(a) from travelling directly through the central and exterior "chimney" zones 18 and 20, respectively. The waste water travels in a parallel fashion between and across the impingement plates 14 allowing removal of lighter phase material such as small oil droplets as previously discussed. The large hydraulic impingement area of the plates reduces the turbulence between the plates allowing proper phase separation.

Column 11, lines 11–27 and 28–42:

As described previously, the lighter phase material such as coalesced oils rise to the top through the outside "chimney" zones 20 and are collected by the skim pipes 54. The heavier phase materials are solids flow downwards towards the central "chimney" zones 18 and settle into the sump 56 for collection. The treated waste water, the lighter and heavier phase materials having been removed, flows out of the rear portion of the phase separator module 10 into an optional secondary purification region which may contain a secondary coalescer 70, containing interwoven HSA mesh of fibrous polypropylene 76 in a rigid metal housing 74. The secondary coalescers are easily removable and are cleanable for reuse. The secondary coalescers like the phase separator modules, preferably include sump baffles 72 to prevent "short circuiting" of the waste water around the coalescers.

The treated waste water is then removed through an outlet port 78 for additional treatment or disposal. As well-known to those skilled in the art, additional water treatment means may be disposed either before or after the phase separator 50 of the present invention, to either pretreat or further purify the waste water treated by the phase separator 50 of the present invention. Additionally, use of the novel phase separator modules 10 of the present invention is not limited to use in oil-water or other phase separation apparatus.

Rather, the phase separator modules may be placed in other types of purifiers, chemical or biological treatment tanks, clarifiers, and agglomerators to enhance the particular purification or treatment process being utilized.

AS A RESULT OF REEXAMINATION, IT HAS BEEN DETERMINED THAT:

The patentability of claims 3 and 21–26 is confirmed.

Claims 1 and 19 are cancelled.

Claims 2, 4, 9, 13, 15, 18, 20, 27, 31, 32 and 35 are determined to be patentable as amended.

Claims 5–8, 10–12, 14, 16, 17, 28–30, 33, 34 and 36, dependent on an amended claim, are determined to be patentable.

New claims 37 and 38 are added and determined to be patentable.

2. An improved separator apparatus as recited in claim [1] *37* wherein said frame further includes means for forming a quiescent region on either side of said impingement plates normal to the direction of flow of said liquid containing mixture to be separated, which includes vertical baffling means for blocking the flow of liquid to be separated.

4. An improved separator apparatus as recited in claim 3, wherein said impingement plates are retained in said frame substantially parallel to the direction of flow of the liquid to be separated, and at a non-horizontal angle to said vertical baffling means.

9. An improved phase separator apparatus as recited in claim [1] *37* wherein said separator module includes more than one stack of said impingement plates retained within said frame.

13. An improved separator apparatus as recited in claim [1] *37* further comprising a cover on said separator tank which allows accessibility to and removal of the phase separator module for servicing and cleaning.

15. An improved separator apparatus as recited in claim [1] *37* wherein said phase separator module further comprises handles on the top of said frame for removal of said phase separator module from said tank.

18. An improved separator apparatus as recited in claim 2, wherein said phase separator module further comprises handles on the top of said frame for removal of said phase separator module from said tank.

20. A process as recited in claim [19] *38* wherein said frame further includes means for forming a quiescent region on either side of said impingement plates normal to the direction of flow of said mixture of liquids and suspended particles to be separated, which includes vertical baffling means for blocking the flow of said mixture of liquids and suspended particles to be separated.

27. A process as recited in claim [19] *38*, wherein said separator module includes more than one stack of said impingement plates retained within said frame.

31. A process as recited in claim [19] *38* further comprising selectively removing impingement plates from said frame to alleviate blocking.

32. A process as recited in claim [19] *38* further comprising selectively inserting impingement plates to said frame to improve separation efficiency.

35. A process as recited in claim [19] *38* further comprising removing said phase separator module from said tank for servicing and cleaning through a cover on the top of said tank.

*37. An improved separator apparatus as recited in claim 1, wherein said removable retention means comprises means for selectively retaining and removing individual impingement plates with the frame.*

*38. A process as recited in claim 19, wherein said removable retention means comprises means for selectively retaining and removing individual impingement plates within said frame.*

* * * * *